United States Patent
Zhang et al.

(10) Patent No.: US 12,483,359 B2
(45) Date of Patent: Nov. 25, 2025

(54) METHOD, APPARATUS AND COMPUTER PROGRAM PRODUCT FOR SCHEDULING DELAY ASSOCIATED WITH HARQ PROCESSES IN LTE-MTC

(71) Applicant: Telefonaktiebolaget LM Ericsson (publ), Stockholm (SE)

(72) Inventors: Liping Zhang, Beijing (CN); Gerardo Agni Medina Acosta, Märsta (SE); Ola Lundqvist, Karlstad (SE); Jie Chen, Beijing (CN); Johan Bergman, Stockholm (SE); Kazuyoshi Uesaka, Kawasaki Kanagawa (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 390 days.

(21) Appl. No.: 18/017,697

(22) PCT Filed: Jul. 27, 2020

(86) PCT No.: PCT/CN2020/104984
§ 371 (c)(1),
(2) Date: Jan. 24, 2023

(87) PCT Pub. No.: WO2022/021034
PCT Pub. Date: Feb. 3, 2022

(65) Prior Publication Data
US 2024/0048290 A1    Feb. 8, 2024

(51) Int. Cl.
*H04L 1/18*    (2023.01)
*H04L 1/1829*    (2023.01)
(Continued)

(52) U.S. Cl.
CPC .......... *H04L 1/1854* (2013.01); *H04L 1/1887* (2013.01); *H04W 72/20* (2023.01)

(58) Field of Classification Search
CPC ... H04L 1/1607; H04L 1/1812; H04L 1/1822; H04L 1/1825; H04L 1/1854; H04L 1/1887; H04L 1/1896; H04W 72/20
See application file for complete search history.

(56) References Cited

U.S. PATENT DOCUMENTS

| 2016/0112162 A1 | 4/2016 | Tabet et al. |
| 2018/0206263 A1* | 7/2018 | Lin ..................... H04W 56/003 |

(Continued)

FOREIGN PATENT DOCUMENTS

| CN | 107547180 A | 1/2018 |
| CN | 111147208 A | 5/2020 |

(Continued)

OTHER PUBLICATIONS

ETSI TS 136 213, LTE; Evolved Universal Terrestrial Radio Access (E-UTRA); Physical layer procedures (3GPP TS 36.213 version 14.14.0 Release 14), 474 pages, Apr. 2020.*

(Continued)

*Primary Examiner* — Frank Duong
(74) *Attorney, Agent, or Firm* — Sage Patent Group

(57) ABSTRACT

The present application generally relates to wireless communication technology. More particularly, the present application relates to a method and apparatus for scheduling delay associated with HARQ processes in LTE-MTC. The present application also relates to computer program product adapted for the same purpose. According to one embodiment, a method for scheduling delay associated with HARQ processes in LTE-MTC comprises: —a) in response to presence or non-presence of PUCCH repetition, invalid BL/CE DL subframe, invalid BL/CE UL subframe, and measurement gap, determining a HARQ-ACK scheduling (Continued)

counting strategy; and —b) scheduling a HARQ-ACK delay value in accordance with the HARQ-ACK scheduling counting strategy.

26 Claims, 10 Drawing Sheets

(51) Int. Cl.
    *H04L 1/1867*     (2023.01)
    *H04W 72/20*     (2023.01)

(56) References Cited

U.S. PATENT DOCUMENTS

| | | | |
|---|---|---|---|
| 2019/0082456 | A1 | 3/2019 | Kim et al. |
| 2021/0084639 | A1* | 3/2021 | Höglund ............... H04W 72/51 |
| 2022/0007404 | A1 | 1/2022 | Gou et al. |
| 2022/0231820 | A1* | 7/2022 | Zaki ...................... H04L 1/1896 |
| 2022/0400506 | A1* | 12/2022 | Yang ...................... H04L 5/0055 |

FOREIGN PATENT DOCUMENTS

| | | |
|---|---|---|
| CN | 111226407 A | 6/2020 |
| CN | 111404651 A | 7/2020 |
| EP | 3471488 A1 | 4/2019 |
| KR | 1020110003584 A | 1/2011 |
| KR | 1020170025219 A | 3/2017 |
| KR | 1020180091019 A | 8/2018 |
| WO | 2017078782 A1 | 5/2017 |
| WO | 2019099469 A1 | 5/2019 |
| WO | 2020063641 A1 | 4/2020 |

OTHER PUBLICATIONS

Qualcomm Incorporated, Orange, Sierra Wireless, Verizon, Ericsson, Sequans, Nokia, Nokia Shanghai Bell, Increased peak data rate for HD-FDD MTC UEs, 3GPP TSG RAN WG1 #99, R1-1912694, 17 pages, Nov. 18-22, 2019; downloadable at https://www.3gpp.org/ftp/tsg_ran/WG1_RL1/TSGR1_99/Docs.*

European Search Report and Opinion for European Patent Application No. 20946929.5 dated May 30, 2023 (11 pages).

Ericsson, "Further enhanced MTC for LTE" RP-170462, Status Report to TSG, 3GPP TSG RAN meeting #75, Dubrovnik, Croatia, Mar. 6-9, 2017, 19 pages.

Notice of Allowance for Korean Patent Application No. 2023-7004537 dated Jan. 17, 2025, 9 pages.

ETSI TS 136 306 V15.4.0, "LTE; Evolved Universal Terrestrial Radio Access (E-UTRA); User Equipment (UE) radio access capabilities (3GPP TS 36.306 version 15.4.0 Release 15)," (May 2019) 121 pages.

3GPP TS 36.133 V16.4.0, "3rd Generation Partnership Project; Technical Specification Group Radio Access Network; Evolved Universal Terrestrial Radio Access (E-UTRA); Requirements for support of radio resource management (Release 16)," Dec. 2019, all pages.

Office Action for Chinese Patent Application No. 202080104596.3 dated Dec. 30, 2024, 7 pages.

Qualcomm Incorporated, "Scheduling of multiple DL/UL transport blocks," R1-1908827, 3GPP TSG RAN WG1 Meeting #98 Prague, Czech Republic, Aug. 26-Aug. 30, 2019, 18 pages.

International Search Report and Written Opinion of the International Searching Authority for PCT International Application No. PCT/CN2020/104984 dated Apr. 22, 2021.

3GPP TS 36.213 V16.2.0, "3rd Generation Partnership Project; Technical Specification Group Radio Access Network; Evolved Universal Terrestrial Radio Access (E-UTRA); Physical layer procedures (Release 16)," Jun. 2020, 576 pages.

3GPP TS 36.212 V16.1.0, "3rd Generation Partnership Project; Technical Specification Group Radio Access Network; Evolved Universal Terrestrial Radio Access (E-UTRA); Multiplexing and channel coding (Release 16)," Mar. 2020, 254 pages.

Qualcomm Incorporated et al., "Increased peak data rate for HD-FDD MTC UEs," R1-1912694, 3GPP TSG RAN WG1 #99, Reno, USA, Nov. 18-22, 2019, 8 pages.

Huawei et al., "New WID on Rel-17 enhancements for NB-IoT and LTE-MTC," RP-193264, 3GPP TSG RAN Meeting #86, Sitges, Spain, Dec. 9-12, 2019, 5 pages.

3GPP TS 36.133 V17.4.0, "3rd Generation Partnership Project; Technical Specification Group Radio Access Network; Evolved Universal Terrestrial Radio Access (E-UTRA); Requirements for support of radio resource management (Release 17)," Dec. 2021, all pages.

* cited by examiner

| Subframe # | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|---|
| MPDCCH | 0 | 1 | 2 | 3 | 4 | 5 | 6 | 7 | 8 | 9 |   |   |   |   |   |   |   | 0 | 1 | 2 | 3 | 4 | 5 | 6 | 7 | 8 | 9 |   |   |
| PDSCH  |   |   | 0 | 1 | 2 | 3 | 4 | 5 | 6 | 7 | 8 | 9 |   |   |   |   |   |   |   | 0 | 1 | 2 | 3 | 4 | 5 | 6 | 7 | 8 | 9 |
| PUCCH (ACK) |   |   |   |   |   |   |   |   |   |   |   |   |   | 0 | 1 | 2 |   |   |   |   |   |   |   |   |   |   |   |   |   |

| | | | | | | | | | | | | | | | | | | | | | |
|---|---|---|---|---|---|---|---|---|---|---|---|---|---|---|---|---|---|---|---|---|---|
| Invalid DL subframe denoted by "0" | 1 | 1 | 1 | 0 | 0 | 1 | 1 | 1 | 1 | 1 | 1 | 1 | 1 | 0 | 0 | 1 | 1 | 1 | 1 | 0 | 1 |
| subframe No | 0 | 1 | 2 | 3 | 4 | 5 | 6 | 7 | 8 | 9 | 10 | 11 | 12 | 13 | 14 | 15 | 16 | 17 | 18 | 19 | 20 |
| MPDCCH | 0 | 1 | 2 | | | 3 | 4 | 5 | 6 | 7 | 8 | 9 | 10 | | | 11 | 12 | 13 | 14 | | 15 |
| PDSCH | | 0 | | | | 1 | 2 | 3 | 4 | 5 | 6 | 7 | 8 | | | 9 | | | | | |
| ACK/NACK | | | | | | | | | | | | | | | | | | 0 | 1 | | 2 |
| delay to 0 | | | | | | | 16 | 13 | 12 | 11 | 10 | 9 | 8 | 7 | 6 | 5 | 4 | 3 | 2 | | |
| delay to 1 | | | | | | | 17 | 14 | 13 | 12 | 11 | 10 | 9 | 8 | 7 | 6 | 5 | 4 | 3 | | |
| delay to 2 | | | | | | | 18 | 15 | 14 | 13 | 12 | 11 | 10 | 9 | 8 | 7 | 6 | 5 | 4 | | |

*Fig. 7*

| subframe No | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| MPDCCH | 0 | 1 | 2 | 3 | 4 | 5 | 6 | 7 | 8 | 9 | | | | | | | | | | | | |
| PDSCH | | | 0 | 1 | 2 | 3 | 4 | 5 | 6 | 7 | 8 | 9 | | | | | | | | | | |
| ACK/NACK | | | | | | | | | | | | | | | | | | | | 0 | 1 | 2 |
| delay to 0 | | | 17 | 16 | 15 | 14 | 13 | 12 | 11 | 10 | 9 | 8 | | | | | | | | | | |
| delay to 1 | | | 18 | 17 | 16 | 15 | 14 | 13 | 12 | 11 | 10 | 9 | | | | | | | | | | |
| delay to 2 | | | 19 | 18 | 17 | 16 | 15 | 14 | 13 | 12 | 11 | 10 | | | | | | | | | | |

*Fig. 8*

| subframe No | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| MPDCCH | 0 | 1 | 2 | 3 | 4 | 5 | 6 | 7 | 8 | 9 | | | | | | | | | | | |
| PDSCH | | | 0 | 1 | 2 | 3 | 4 | 5 | 6 | 7 | 8 | 9 | | | | | | | | | |
| ACK/NACK | | | | | | | | | | | | | | 0 | 0 | 0 | 0 | 0 | 0 | 0 | 0 |
| delay to 0 | 11 | 10 | 9 | 8 | 7 | 6 | 5 | 4 | 3 | 2 | 3 | 2 | | | | | | | | | |
| delay to 1 | | 19 | 18 | 17 | 16 | 15 | 14 | 13 | 12 | 11 | 10 | | | | | | | | | | |
| delay to 2 | | 27 | 26 | 25 | 24 | 23 | 22 | 21 | 20 | 19 | 18 | | | | | | | | | | |

| 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|
| | | | | | | | | | | | | | | | | | | | |
| | | | | | | | | | | | | | | | | | | | |
| | | | | | | | | | | | | | | | | | | | |
| 1 | 1 | 1 | 1 | 1 | 1 | 1 | 1 | 2 | 2 | 2 | 2 | 2 | 2 | 2 | 2 | | | | |
| | | | | | | | | | | | | | | | | | | | |
| | | | | | | | | | | | | | | | | | | | |

METHOD, APPARATUS AND COMPUTER PROGRAM PRODUCT FOR SCHEDULING DELAY ASSOCIATED WITH HARQ PROCESSES IN LTE-MTC

TECHNICAL FIELD

The present application generally relates to wireless communication technology. More particularly, the present application relates to a method and apparatus for scheduling delay associated with HARQ processes in LTE-MTC. The present application also relates to computer program product adapted for the same purpose.

BACKGROUND

At the RAN plenary meeting #86, a new Work Item (WI) entitled "Rel-17 enhancements for NB-IoT and LTE-MTC" was agreed. One of its objectives consists in specifying for LTE-MTC the introduction of 14 HARQ processes in DL as stated in the Work Item Description (WID): Support additional PDSCH scheduling delay for introduction of 14-HARQ processes in DL, for HD-FDD Cat M1 UEs. [LTE-MTC] [RAN1]

The WID's objective for LTE-MTC targets HD-FDD Cat M1 UEs, which peak data rate can be achieved through the combined usage of 10 HARQ processes and HARQ-ACK bundling as depicted in FIG. 1.

In FIG. 1, the solid and dotted arrows illustrate examples of the "Scheduling delay for PDSCH" (encompassing 2 subframes) and "HARQ-ACK delay" (encompassing 11 subframes) respectively.

The Rel-17 enhancement for LTE-MTC aims at increasing the peak data rate through the "Support of additional PDSCH scheduling delay for introduction of 14-HARQ processes in DL, for HD-FDD Cat M1 UEs", which, as shown in FIG. 2, is intended to be done by using the framework depicted in FIG. 1.

In FIG. 2, the solid and dotted arrows illustrate examples of the "Scheduling delay for PDSCH" (encompassing 7 subframes) and "HARQ-ACK delay" (encompassing 13 subframes) respectively.

In relation to the introduction of 14 HARQ processes in DL, it reads as: "Assuming a TBS of 1000 bits is transmitted in each of the PDSCH, the peak data rate achieved by this scheduling is (10×1000)/17=588 kbps. In this contribution, we propose to increase the peak data rate to (12×1000)/17=706 kbps (20% increase) by allowing data scheduling in subframes 0 and 1". See R1-1912694, "Increased peak data rate for HD-FDD MTC UEs," Qualcomm Incorporated, Orange, Sierra Wireless, Verizon, Ericsson, Sequans, Nokia, Nokia Shanghai Bell, RAN1 #99, Reno, USA, Nov. 18-22, 2019, which is incorporated herein by reference in its entirety.

Although the increase in peak data rate is estimated using 12 HARQ processes, there are 14 HARQ processes in total. As can be seen in FIG. 2, the reason for having 14 HARQ processes (i.e., spanning from #0 to #13) is that the HARQ processes #10 and #11 (tied to MPDCCH 10 and 11) need to wait for the ACK bundling that follows the upcoming set of MPDCCHs ending with HARQ processes #12 and #13 (tied to MPDCCH 12 and 13).

From FIG. 2, it can be seen that the introduction of 14 HARQ process in DL would require adding new values for both the "Scheduling delay for PDSCH" and "HARQ-ACK delay".

In legacy when there are 10-HARQ processes, the "Scheduling delay for PDSCH" uses a value of 2. That is, the PDSCH starts on the second subframe after the end of the MPDCCH used to schedule the corresponding DL data. On the other hand, when there are 14 HARQ processes the "Scheduling delay for PDSCH" requires a value equal to 7 in addition to the legacy value that is equal to 2 (See FIG. 2).

In R1-1912694, "Increased peak data rate for HD-FDD MTC UEs," Qualcomm Incorporated, Orange, Sierra Wireless, Verizon, Ericsson, Sequans, Nokia, Nokia Shanghai Bell, RAN1 #99, Reno, USA, Nov. 18-22, 2019, it has been proposed that the "Scheduling delay for PDSCH" can support the value of 7 in addition to the legacy value of 2, whereas for the "HARQ-ACK delay" it has been proposed to use the following values: 4, 5, 6, 7, 9, 11, 13, 15.

Regarding HARQ-ACK delay, it is described in the current 3GPP specifications. In particular, HARQ-ACK delay for BL/CE UE in CE ModeA is shown in Table 1 as below:

TABLE 1

| HARQ-ACK delay for BL/CE UE in CE ModeA | | |
|---|---|---|
| 'HARQ-ACK delay' field in DCI | HARQ-ACK delay value when 'ce-SchedulingEnhancement' set to 'range1' | HARQ-ACK delay value when 'ce-SchedulingEnhancement' set to 'range2', or 'ce-SchedulingEnhancement' is not configured and 'ce-HARQ-AckBundling' is set |
| 000 | 4 | 4 |
| 001 | 5 | 5 |
| 010 | 7 | 6 |
| 011 | 9 | 7 |
| 100 | 11 | 8 |
| 101 | 13 | 9 |
| 110 | 15 | 10 |
| 111 | 17 | 11 |

For details, please refer to 3GPP specification TS 36.213, "Evolved Universal Terrestrial Radio Access (E-UTRA); Physical layer procedures", version 16.2.0, which is incorporated herein by reference in its entirety. The current specification allows at most 10 HARQ processes in FDD, and as can be seen from the table above the maximum HARQ-ACK delay for 'ce-HARQ-AckBundling' is 11.

SUMMARY

One of the objectives of the WI on "Rel-17 enhancements for NB-IoT and LTE-MTC" is to introduce "14-HARQ processes in DL, for HD-FDD Cat M1 UEs", the problems envisioned towards its support are listed below:

The proposal of introducing "14-HARQ processes in DL, for HD-FDD Cat M1 UEs" does not consider further delays caused when the feature happens to coexists with other scenarios/features, which will impact the HARQ-ACK delays.

Depending on the scenarios where the 14 HARQ process feature will be intended to be used, there will be a need for using specific HARQ-ACK delay values.

According to one aspect of the present disclosure, a selective HARQ-ACK delay counting strategy has been described in the form of Tables providing delays associated to PUCCH (e.g., PUCCH #0, PUCCH #1 and PUCCH #2)

when the "14 HARQ processes in DL using HARQ-ACK bundling for a Cat M1 HD-FDD UE" is in presence of:
- PUCCH repetitions, Invalid BL/CE DL subframes and Invalid BL/CE UL subframes.
- PUCCH repetitions, Invalid BL/CE DL subframes, Invalid BL/CE UL subframes, and measurement gaps (MG).

In the present disclosure, the term "invalid BL/CE DL subframes" corresponds to the term "non-BL/CE DL subframes" in the 3GPP technical specifications.

The solutions as described in the present disclosure are backward compatible with the 3GPP standard since they utilize existing framework (e.g., BL/CE DL subframes) to create the selective HARQ-ACK delay counting strategy.

According to one embodiment, a method for scheduling delay associated with HARQ processes in LTE-MTC comprises:
- a) in response to presence or non-presence of PUCCH repetition, invalid BL/CE DL subframe, invalid BL/CE UL subframe, and measurement gap, determining a HARQ-ACK scheduling counting strategy; and
- b) scheduling a HARQ-ACK delay value in accordance with the HARQ-ACK scheduling counting strategy.

According to another embodiment, a method for scheduling delay associated with HARQ processes in LTE-MTC comprises the following steps performed by a UE:
- a) receiving a HARQ-ACK delay value; and
- b) transmitting a PUCCH subframe for HARQ-ACK or HARQ-NACK with the HARQ-ACK delay value,
- wherein the HARQ-ACK delay value is scheduled in accordance with the HARQ-ACK scheduling counting strategy, which is determined in response to presence or non-presence of PUCCH repetition, invalid BL/CE DL subframe, invalid BL/CE UL subframe, and measurement gap, determining a HARQ-ACK scheduling counting strategy.

According to another embodiment, an apparatus for scheduling delay associated with HARQ processes in LTE-MTC comprises:
- a storage device configured to store a computer program comprising computer instructions; and
- a processor coupled to the storage device and configured to execute the computer instructions to perform the method as described above.

According to another embodiment, a computer program product for scheduling delay associated with HARQ processes in LTE-MTC, the computer program product being embodied in a computer readable storage medium and comprising computer instructions for perform the method as described above.

BRIEF DESCRIPTION OF THE DRAWINGS

The foregoing and other objects, features, and advantages would be apparent from the following more particular description of preferred embodiments as illustrated in the accompanying drawings in which:

FIG. 1 schematically illustrates combined usage of 10 HARQ processes and HARQ-ACK bundling for a Cat M1 HD-FDD UE.

FIG. 2 schematically illustrates Combined usage of 14 HARQ processes and HARQ-ACK bundling for a Cat M1 HD-FDD UE.

FIGS. 7-9 schematically illustrates some examples where the HARQ-ACK delay values are insufficient.

FIGS. 10-12 schematically illustrates some examples where the selective HARQ-ACK delay counting strategies are used.

DETAILED DESCRIPTION

Figure 3:
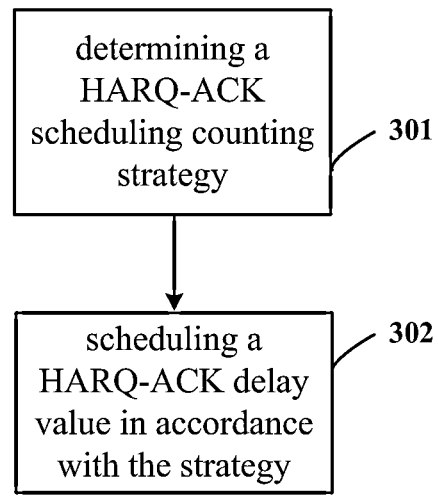
FIG. 3 schematically illustrates a flowchart of the method for scheduling delay associated with HARQ processes in LTE-MTC according to one embodiment of the present invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions. The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A flowchart of a method 300 for scheduling delay associated with HARQ processes in LTE-MTC according to one embodiment of the present invention is shown in FIG. 3.

As shown in FIG. 3, the flowchart comprises the following steps performed, e.g., at NodeB side:

Step 301: in response to presence or non-presence of PUCCH repetition, invalid BL/CE DL subframe, invalid BL/CE UL subframe, and measurement gap, determining a HARQ-ACK scheduling counting strategy.

Step 302: scheduling a HARQ-ACK delay value in accordance with the HARQ-ACK scheduling counting strategy.

In this embodiment, preferably, the flowchart further comprises the step of transmitting DCI including the HARQ-ACK delay value to a UE.

In this embodiment, preferably, the HARQ-ACK delay value is represented as one of a plurality of multi-bit values which are stored in a HARQ-ACK delay table.

In this embodiment, preferably, the determining of the HARQ-ACK scheduling counting strategy comprising the step of selecting one of a plurality of candidate HARQ-ACK delay counting strategies as the HARQ-ACK scheduling counting strategy on the basis of presence or non-presence of PUCCH repetition, invalid BL/CE DL subframe, invalid BL/CE UL subframe, and measurement gap.

In this embodiment, preferably, in the presence of PUCCH repetition, invalid BL/CE DL subframe, and invalid BL/CE UL subframe, in the case of 14 HARQ processes in DL using HARQ-ACK bundling for a Cat M1 HD-FDD UE, the scheduling is carried out follows:

for HARQ-ACK delay between HARQ #n and HARQ-ACK bundle 0, the HARQ-ACK delay value is set as: 11 BL/CE DL subframes+1 absolute subframe for DL/UL switch subframe+1 BL/CE UL subframe;

for HARQ-ACK delay between HARQ #n and HARQ-ACK bundle 1, the HARQ-ACK delay value is set as: 11 BL/CE DL subframes+1 absolute subframe for DL/UL switch subframe)+(1*Rpucch+1) BL/CE UL subframes; and for HARQ-ACK delay between HARQ #n and HARQ-ACK bundle 2, the HARQ-ACK delay value is set as: 11 BL/CE DL subframes+1 absolute subframe for DL/UL switch subframe)+(2*Rpucch+1) BL/CE UL subframes, Wherein HARQ #n represents a HARQ process with max HARQ-ACK delay, Rpucch represents a number of PUCCH repetitions and a delay counting for the HARQ-ACK delay value starts after the last subframe in which PDSCH is transmitted.

In this embodiment, preferably, in the presence of PUCCH repetition, invalid BL/CE DL subframe, invalid BL/CE UL subframe and measurement gap, in the case of 14 HARQ processes in DL using HARQ-ACK bundling for a Cat M1 HD-FDD UE, the scheduling is carried out follows:

for an average of HARQ-ACK delay between HARQ #n and HARQ-ACK bundle 0, the HARQ-ACK delay value is set as:

ceil(11/(1−x %) BL/CE DL subframes no overlapping measurement gaps+1 absolute subframe for DL/UL switch subframe unless it overlaps measurement gaps+ 1/(1−y %) BL/CE UL subframes not overlapping measurement gaps+{0 without measurement gaps; 6 or 7 with measurement gaps} absolute subframes);

for HARQ-ACK delay between HARQ #n and HARQ-ACK bundle 1, the HARQ-ACK delay value is set as:

ceil(11/(1−x %) BL/CE DL subframes not overlapping measurement gaps+1 absolute subframe for DL/UL switch subframe unless it overlaps measurement gaps+ (1*Rpucch+1)/(1−y %) BL/CE UL subframes no overlapping measurement gaps+{0 without measurement gaps; 6 or 7 with measurement gaps} absolute subframes);

for an average of HARQ-ACK delay between HARQ #n and HARQ-ACK bundle 2, the HARQ-ACK delay value is set as:

ceil(11/(1−x %) BL/CE DL subframes not overlapping measurement gaps+1 absolute subframe for DL/UL switch subframe unless it overlaps measurement gaps+ (2*Rpucch+1)/(1−y %) BL/CE UL subframes no overlapping measurement gaps+{0 without measurement gaps; 6 or 7 with measurement gaps} absolute subframes), wherein x % represents a fraction of invalid BL/CE DL subframes in relation to BL/CE DL subframes not overlapping measurement gaps, y % represents a fraction of invalid BL/CE UL subframes in relation to BL/CE DL subframes not overlapping measurement gaps, and Rpucch represents a number of PUCCH repetitions.

In this embodiment, preferably, in the non-presence of PUCCH repetition, invalid BL/CE DL subframe, invalid BL/CE UL subframe and measurement gap, in the case of 14 HARQ processes in DL using HARQ-ACK bundling for a Cat M1 HD-FDD UE, the scheduling is carried out in accordance with procedure as specified in 3GPP TS 36.213, which is incorporated herein by reference in its entirety.

In this embodiment, preferably, the definition of BL/CE DL subframe and BL/CE UL subframe remain the same as legacy, whereas the definition of absolute subframe refers to any type of subframe.

In this embodiment, preferably, an invalid BL/CE DL subframe is used for performing a DL-to-UL switching or UL-to-DL switching, or transmitting in UL.

In this embodiment, preferably, an invalid BL/CE UL subframe is used for performing a DL-to-UL switching or UL-to-DL switching, or transmitting in DL.

Figure 4:
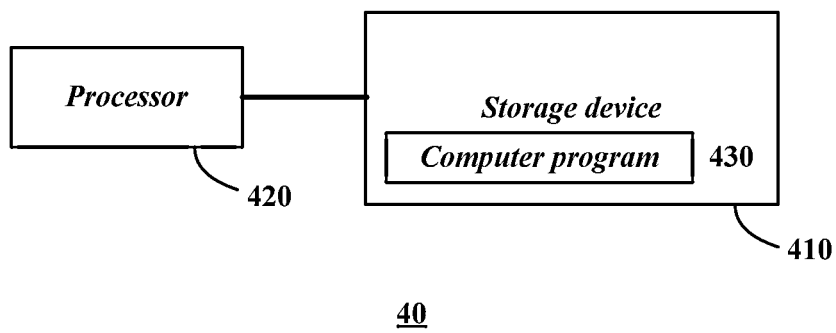
FIG. 4 is a block diagram illustrating an apparatus for scheduling delay associated with HARQ processes in LTE-MTC according to another embodiment.

FIG. 4 is a block diagram illustrating an apparatus for scheduling delay associated with HARQ processes in LTE-MTC according to another embodiment.

With reference to FIG. 4, the apparatus 40 comprises a storage device 410 and a processor 420 coupled to the storage device 410. The storage device 410 is configured to store a computer program 430 comprising computer instructions. The processor 420 is configured to execute the computer instructions to perform some or all of the method steps as shown in FIG. 3.

Figure 5:
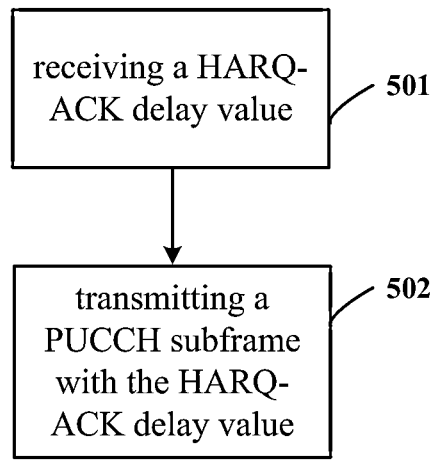
FIG. 5 schematically illustrates a flowchart of the method for scheduling delay associated with HARQ processes in LTE-MTC according to one embodiment of the present invention.

A flowchart of a method 500 for scheduling delay associated with HARQ processes in LTE-MTC according to another embodiment of the present invention is shown in FIG. 5.

As shown in FIG. 5, the flowchart comprises the following steps performed at UE side:

Step 501: receiving a HARQ-ACK delay value.

Step 502: transmitting a PUCCH subframe for HARQ-ACK or HARQ-NACK with the HARQ-ACK delay value.

In this embodiment, the HARQ-ACK delay value is scheduled in accordance with the HARQ-ACK scheduling counting strategy, which is determined in response to presence or non-presence of PUCCH repetition, invalid BL/CE DL subframe, invalid BL/CE UL subframe, and measurement gap, determining a HARQ-ACK scheduling counting strategy.

In this embodiment, preferably, the HARQ-ACK delay value is included in DCI from a NodeB.

In this embodiment, preferably, the HARQ-ACK delay value is represented as one of a plurality of multi-bit values which are stored in a HARQ-ACK delay table.

Figure 6:
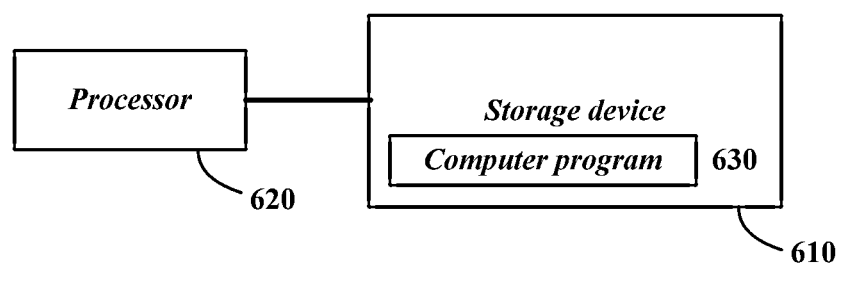
FIG. 6 is a block diagram illustrating an apparatus for scheduling delay associated with HARQ processes in LTE-MTC according to another embodiment.

FIG. 6 is a block diagram illustrating an apparatus for scheduling delay associated with HARQ processes in LTE-MTC according to another embodiment.

With reference to FIG. 6, the apparatus 60 comprises a storage device 610 and a processor 620 coupled to the storage device 610. The storage device 610 is configured to store a computer program 630 comprising computer instructions. The processor 620 is configured to execute the computer instructions to perform some or all of the method steps as shown in FIG. 5.

The Rel-17 objective on introducing "14-HARQ processes in DL, for HD-FDD Cat M1 UEs" fails to consider further delays caused when the feature happens to coexist with PUCCH repetitions, invalid BL/CE DL subframes, invalid BL/CE UL subframes, and measurement gaps, which will impact the HARQ-ACK delays. In the present disclosure, methods for supporting the introduction of "N-HARQ processes in DL, for HD-FDD Cat M1 UEs" in presence of PUCCH repetitions, invalid BL/CE DL subframes, invalid BL/CE UL subframes, and measurement gaps are described. For illustrative purpose and to stay aligned with the Rel-17 WID, the methods are described using 14 HARQ processes as a basis, but they can be applied to an N number of HARQ processes.

Throughout the present disclosure, the term "invalid BL/CE DL subframes" used herein may correspond to the term "non-BL/CE DL subframes" in the 3GPP technical specifications.

In general, in presence of MG, invalid BL/CE DL subframes, invalid BL/CE UL subframes, and PUCCH repetitions, the HARQ-ACK delay values available are insufficient and thus will limit the number of HARQ processes that can be used. The examples below illustrate that even with 10 HARQ processes in DL using HARQ-ACK bundling, the set of HARQ-ACK delay values available results insufficient to deal with the required HARQ-ACK delays.

Example 1: "Downlink subframe bitmap 1110011110, which denotes the invalid BL/CE DL subframes with '0'" is described with reference to FIG. 7.

In Example 1, not all the 10 HARQ processes can be scheduled, as there are no available HARQ-ACK delay values for HARQ process 0, 1, and 2. That is, in FIG. 7, only the delay values highlighted with a "diagonal dash" pattern are available in HARQ-ACK delay set for 'ce-HARQ-AckBundling' (See Table 1).

Example 2: "Measurement gaps. The measurement gap duration and its periodicity are defined through the variable Measurement Gap Length (MGL) and the Measurement Gap Repetition Period (MGRP) as defined in 3GPP specification TS 36.133" is described with reference to FIG. 8.

The +1 subframe is because it is assumed that Cat-M1 UEs cannot transmit anything in UL in the subframe after the measurement gap. In Example 2, not all the 10 HARQ processes can be scheduled, as there are no available HARQ-ACK delays for HARQ process 0, 1, 2, 3, 4, 5.

Example 3: "This example illustrates the presence of PUCCH repetitions for the case when the number of PUCCH repetitions=8" is described with reference to FIG. 9.

In Example 3, not all the 10 HARQ processes can be scheduled, as there are not sufficiently many available HARQ-ACK delay values. It is known that PUCCH 0, 1, and 2 can respectively handle up to 4 HARQ processes each. Thus, in Example 3:

It is possible to bundle any combination of 4 HARQ processes from 0 to 7 using PUCCH 0 (e.g., HARQ process 0, 1, 2, and 3 sending ACK/NACK using all PUCCH or Up to 6 HARQ processes could be handled by bundling 4 HARQ processes from 0 to 7 using PUCCH 0, and 2 HARQ process 8 and 9 using PUCCH 1.

In Rel-17, the introduction of "14 HARQ processes in DL using HARQ-ACK bundling for a Cat M1 HD-FDD UE" will require additional HARQ-ACK delay values and will limit even more the number of HARQ processes that can be used.

Figure 2:
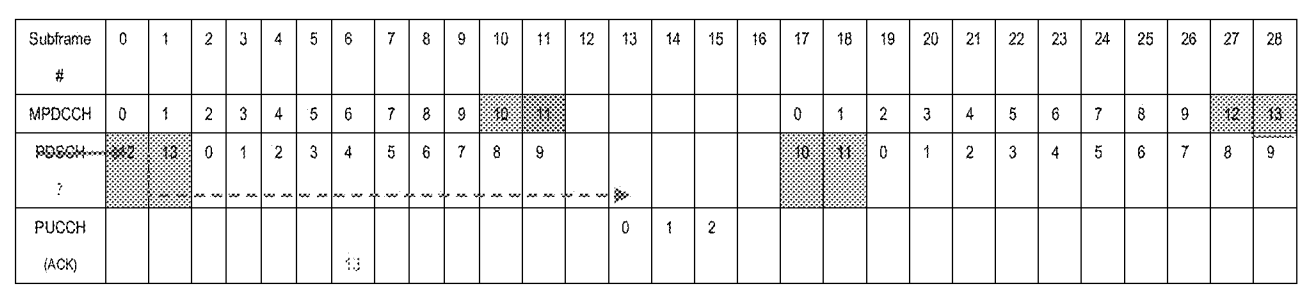

As described above, for 14 HARQ processes, at most 12 HARQ processes can be handled by a given HARQ-ACK bundling set consisting of 3 PUCCHs. Although there are 14 HARQ processes in total, the increase in peak data rate is estimated using 12 HARQ processes due that 2 out of 14 processes require cross UL transmissions (see FIG. 2). The term "cross UL transmission" is used for describing the case of DL data scheduling for a particular DL HARQ process where an UL (PUCCH) transmission takes place between the MPDCCH carrying the DL grant and the associated PDSCH carrying the DL data. Introduction of 14 HARQ processes using HARQ-ACK bundling in presence of PUCCH repetitions, Invalid BL/CE DL subframes and Invalid BL/CE UL subframes.

In one embodiment for the introduction of "14 HARQ processes in DL using HARQ-ACK bundling for a Cat M1 HD-FDD UE", the HARQ-ACK delays in presence of invalid BL/CE DL subframes, invalid BL/CE UL subframes, and PUCCH repetitions (i.e., the number of PUCCH repetitions, and it is referred to as "Rpucch") is handled according to the following HARQ-ACK scheduling counting strategy:

Assuming the HARQ process with max HARQ-ACK delay is HARQ #n and that the delay counting starts after the last subframe in which the PDSCH is transmitted, then HARQ-ACK delay between HARQ #n and HARQ-ACK bundle 0 is 11 BL/CE DL subframes+1 absolute subframe (i.e., for DL/UL switch subframe)+1 BL/CE UL subframe HARQ-ACK delay between HARQ #n and HARQ-ACK bundle 1 is 11 BL/CE DL subframes+1 absolute subframe (i.e., for DL/UL switch subframe)+(1*Rpucch+ 1) BL/CE UL subframes HARQ-ACK delay between HARQ #n and HARQ-ACK bundle 2 is 11 BL/CE DL subframes+1 absolute subframe (i.e., for DL/UL switch subframe)+(2*Rpucch+ 1) BL/CE UL subframes In one embodiment, the sign "+" means "followed by" as to account for the order in which the delays are counted.

In one embodiment, the definition of BL/CE DL subframe and BL/CE UL subframe remain the same as legacy, whereas the definition of absolute subframe refers to any type of subframe.

In one embodiment, it is assumed that an invalid BL/CE DL subframe can be used to perform either a DL-to-UL switching, UL-to-DL switching, or to transmit in UL (e.g., PUCCH).

In one embodiment, it is assumed that an invalid BL/CE UL subframe can be used to perform either a DL-to-UL switching, UL-to-DL switching, or to transmit in DL (e.g., MPDCCH, or PDSCH).

Introduction of 14 HARQ Processes Using HARQ-ACK Bundling in Presence of PUCCH Repetitions, Invalid BL/CE DL Subframes, Invalid BL/CE UL Subframes and Measurement Gaps.

In one embodiment, the presence of measurement gaps is incorporated to the HARQ-ACK scheduling counting strategy as follows:

Assuming a fraction x % of invalid BL/CE DL subframes, a fraction y % of invalid BL/CE UL subframes, and that the measurement gap length is 6 or 7:

The equations under the three sub-bullets below describe the average HARQ-ACK delay from the farthest HARQ process (described below as "HARQ #n") that can be bundled to either PUCCH 0, 1, or 2 respectively. The HARQ-ACK delay starts from the subframe after the end of the PDSCH till the subframe used to transmit either PUCCH 0, 1, or 2. The equations below incorporate percentagewise the presence of invalid subframes and measurement gaps. The no presence of invalid subframes nor measurement gaps can be used as a starting point to understand the equations below, since such a case leads to an average HARQ-ACK delay from the farthest HARQ process to PUCCH 0, 1 and 2 equal to 13, 14, and 15 respectively, which resembles FIG. 2 where the farthest HARQ process is "HARQ #12" (See also in the upper part of Table 2 the column corresponding to a 0% for x and y).

The average HARQ-ACK delay between HARQ #n and HARQ-ACK bundle 0 is ceil(11/(1−x %)) BL/CE DL subframes no overlapping measurement gaps+1 absolute subframe (i.e., for DL/UL switch subframe) unless it overlaps measurement gaps+1/(1−y %) BL/CE UL subframes no overlapping measurement gaps+{0, w/o MG; 6 or 7 with MG} absolute subframes)

The HARQ-ACK delay between HARQ #n and HARQ-ACK bundle 1 is ceil(11/(1−x %)) BL/CE DL subframes no overlapping measurement gaps+1 absolute subframe (i.e., DL/UL switch subframe) unless it overlaps measurement gaps+(1*Rpucch+1)/(1−y %) BL/CE UL subframes no overlapping measurement gaps+{0, w/o MG; 6 or 7 with MG} absolute subframes)

The average HARQ-ACK delay between HARQ #n and HARQ-ACK bundle 2 is ceil(11/(1−x %)) BL/CE DL subframes no overlapping measurement gaps+1 absolute subframe (i.e., DL/UL switch subframe) unless it overlaps measurement gaps+(2*Rpucch+1)/(1−y %) BL/CE UL subframes no overlapping measurement gaps+{0, w/o MG; 6 or 7 with MG} absolute subframes).

In one embodiment, the sign "+" means "followed by" as to account for the order in which the delays are counted.

In one embodiment, the definition of BL/CE DL subframe, BL/CE UL subframe, and measurement gaps remain the same as legacy, whereas the definition of absolute subframe refers to any type of subframe.

In one embodiment, it is assumed that an invalid BL/CE DL subframe can be used to perform either a DL-to-UL switching, UL-to-DL switching, or to transmit in UL (e.g., PUCCH).

In one embodiment, it is assumed that an invalid BL/CE UL subframe can be used to perform either a DL-to-UL switching, UL-to-DL switching, or to transmit in DL (e.g., MPDCCH, or PDSCH).

Table 2 illustrates the presence in different percentages of invalid BL/CE DL subframes, invalid BL/CE UL subframes, several cases of PUCCH repetitions and their impact on the HARQ-ACK delay.

TABLE 2

Presence in different percentages of invalid BL/CE DL subframes, invalid BL/CE UL subframes, PUCCH repetitions and their impact on the HARQ-ACK delay.

| | | invalid DL subframe | | | | | | | | | |
|---|---|---|---|---|---|---|---|---|---|---|---|
| | | 0 | 30% | 40% | 60% | 60% | 0 | 30% | 40% | 60% | 60% |
| | | | | | | invalid UL subframe | | | | | |
| | | 0 | 20% | 20% | 0 | 60% | 0 | 20% | 20% | 0 | 60% |
| | | | | | | PUCCH repetition | | | | | |
| | | 1 | 1 | 1 | 1 | 1 | 2 | 2 | 2 | 2 | 2 |
| Average | HARQ-ACK bundle 0 | 13 | 18 | 21 | 30 | 31 | 13 | 18 | 21 | 30 | 31 |
| HARQ-ACK | HARQ-ACK bundle 1 | 14 | 20 | 22 | 31 | 34 | 15 | 21 | 24 | 32 | 36 |
| delay for | HARQ-ACK bundle 2 | 15 | 20 | 23 | 32 | 36 | 17 | 23 | 26 | 34 | 41 |
| HARQ #n | | | | | | | | | | | |
| | | invalid DL subframe | | | | | | | | | |
| | | 0 | 30% | 40% | 60% | 60% | 0 | 30% | 40% | 60% | 60% |
| | | | | | | invalid UL subframe | | | | | |
| | | 0 | 20% | 20% | 0 | 60% | 0 | 20% | 20% | 0 | 60% |
| | | | | | | PUCCH repetition | | | | | |
| | | 4 | 4 | 4 | 4 | 4 | 8 | 8 | 8 | 8 | 8 |
| Average | HARQ-ACK bundle 0 | 13 | 18 | 21 | 30 | 31 | 13 | 18 | 21 | 30 | 31 |
| HARQ-ACK | HARQ-ACK bundle 1 | 17 | 23 | 26 | 34 | 41 | 21 | 28 | 31 | 38 | 51 |

TABLE 2-continued

Presence in different percentages of invalid BL/CE DL subframes, invalid BL/CE
UL subframes, PUCCH repetitions and their impact on the HARQ-ACK delay.

| delay for HARQ #n | HARQ-ACK bundle 2 | 21 | 28 | 31 | 38 | 51 | 29 | 38 | 41 | 46 | 71 |
|---|---|---|---|---|---|---|---|---|---|---|---|

In relation to the example in Table 2, if PDSCH scheduling encounters MG, then the HARQ-ACK delay for HARQ #n is increased by 6 or 7 subframes.

In one embodiment for the introduction of "14 HARQ processes in DL using HARQ-ACK bundling for a Cat M1 HD-FDD UE", the HARQ-ACK scheduling counting strategy is made compatible with the set of HARQ-ACK delay values in 3GPP specification TS 36.213, "Evolved Universal Terrestrial Radio Access (E-UTRA); Physical layer procedures", version 16.2.0. by increasing the "HARQ-ACK delay" field size by 1 bit in DCI Format 6-1A (i.e., to use 4 bits instead of 3 bits), which increases the number of HARQ-ACK delay values from 8 to 16. Alternatively, a new 4-bit field in DCI Format 6-1A is introduced to provide the HARQ-ACK delays when "14 HARQ processes in DL using HARQ-ACK bundling for a Cat M1 HD-FDD UE" is configured.

In one embodiment, the "HARQ-ACK delay for BL/CE UE in CE ModeA" is updated similarly to Table 3 below to handle the HARQ delays in presence of PUCCH repetitions, invalid BL/CE DL subframes, invalid BL/CE UL subframes, and Measurement gaps when "14 HARQ processes in DL using HARQ-ACK bundling for a Cat M1 HD-FDD UE" is configured.

TABLE 3

"HARQ-ACK delay for BL/CE UE in CE ModeA"
including the support of "14 HARQ processes
in DL using HARQ-ACK bundling for a Cat M1 HD-FDD UE".

| 'HARQ-ACK delay' field in DCI | HARQ-ACK delay value when 'ce-pdsch-fourteenProcesses' is set | Note |
|---|---|---|
| 0000 | 4 | All HARQ-ACK delays in Rel-16 when 'ce-HARQ-AckBundling' is set are kept |
| 0001 | 5 | |
| 0010 | 6 | |
| 0011 | 7 | |
| 0100 | 8 | |
| 0101 | 9 | |
| 0110 | 10 | |
| 0111 | 11 | |
| 1000 | 13 | The values 13 and 15 are needed for the most basic use of the "14 HARQ processes in DL using HARQ-ACK bundling for a Cat M1 HD-FDD UE", i.e. without invalid DL/UL subframe, MG or PUCCH repetitions. |
| 1001 | 15 | |
| 1010 | 18 | These set of values represent example of the integer values that can introduced to cover more cases with invalid DL/UL subframe, MG or PUCCH repetition |
| 1011 | 20 | |
| 1100 | 23 | |
| 1101 | 25 | |
| 1110 | 28 | |
| 1111 | 30 | |

In Table 3, the largest step in 'HARQ-ACK delay' is 3 (e.g., from 15 to 18). With HARQ-ACK bundling, the channel condition is basically good, so only a small number of PUCCH repetitions need to be covered for most cases, e.g. 1 2 or even 4 repetitions. When MG is for RSTD, the MGL is usually very large, which will result in a large HARQ-ACK delay, so only relatively small MGL needs to be covered, e.g. MGL=6.

In dependent embodiment when the "14 HARQ processes in DL using HARQ-ACK bundling for a Cat M1 HD-FDD UE" is configured and the "HARQ-ACK delay" field uses 4 bits:

8 out of the 16 combinations provided by the 4 bits of the "HARQ-ACK delay" field correspond to the set of HARQ-ACK delay values available in legacy (i.e., 4, 5, 6, 7, 8, 9, 10, and 11) as to offer backward compatibility.

2 out of the 16 combinations provided by the 4 bits of the "HARQ-ACK delay" field correspond to the additionally required HARQ-ACK delay values (i.e., 13 and 15) when the "14 HARQ processes in DL using HARQ-ACK bundling for a Cat M1 HD-FDD UE" is configured and used in its most basic form without accounting for the presence of PUCCH repetitions, invalid BL/CE DL subframes, invalid BL/CE UL subframes, and Measurement gaps.

6 out of the 16 combinations provided by the 4 bits of the "HARQ-ACK delay" field correspond to additional HARQ-ACK delay values used to handle scenarios when the "14 HARQ processes in DL using HARQ-ACK bundling for a Cat M1 HD-FDD UE" is configured and is subject to the individual or simultaneous presence of PUCCH repetitions, invalid BL/CE DL subframes, invalid BL/CE UL subframes, and Measurement gaps.

The set of HARQ-ACK delay values used to deal with the individual or simultaneous presence of PUCCH repetitions, invalid BL/CE DL subframes, invalid BL/CE UL subframes, and Measurement gaps can be any integer value (e.g., obtained from statistics, simulations, etc.) not limited to the set of values used for illustration purposes in Table 3.

The set of HARQ-ACK delay values do not cover all possible scenarios that may arise from having individual or simultaneous presence of PUCCH repetitions, invalid BL/CE DL subframes, invalid BL/CE UL subframes, and Measurement gaps, but is intended to assess the most common scenarios envisioned for real deployments.

Figure 10:
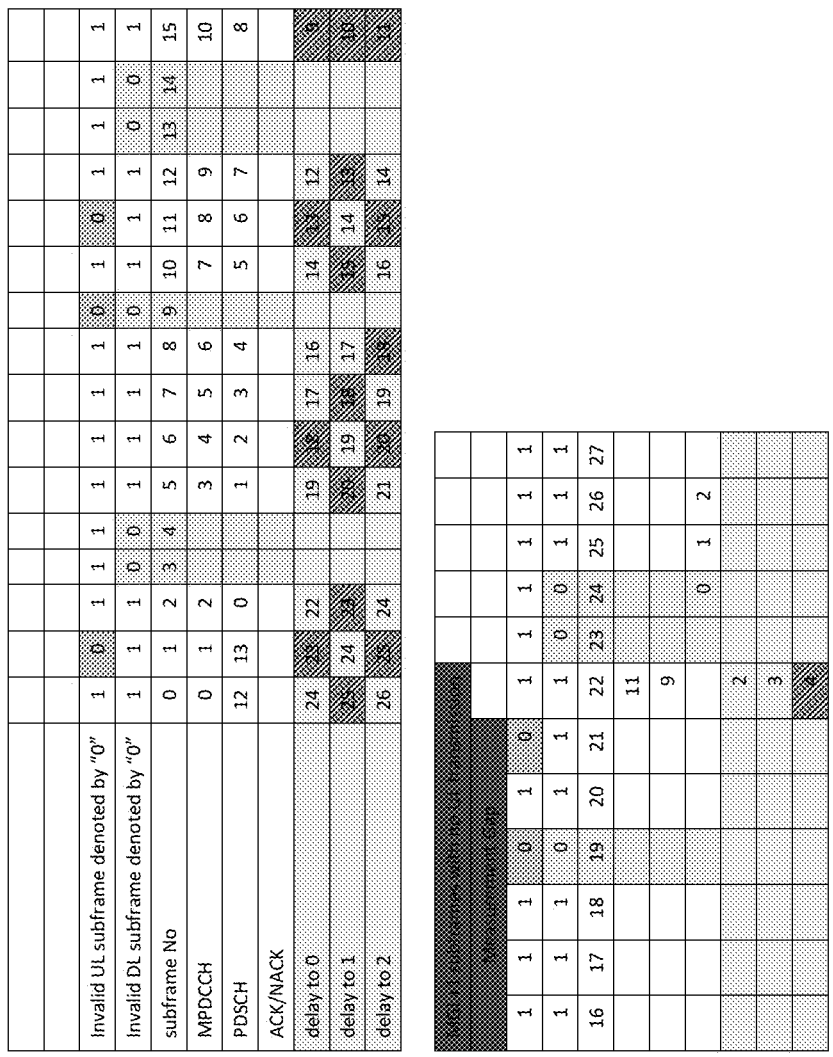
Figure 11:
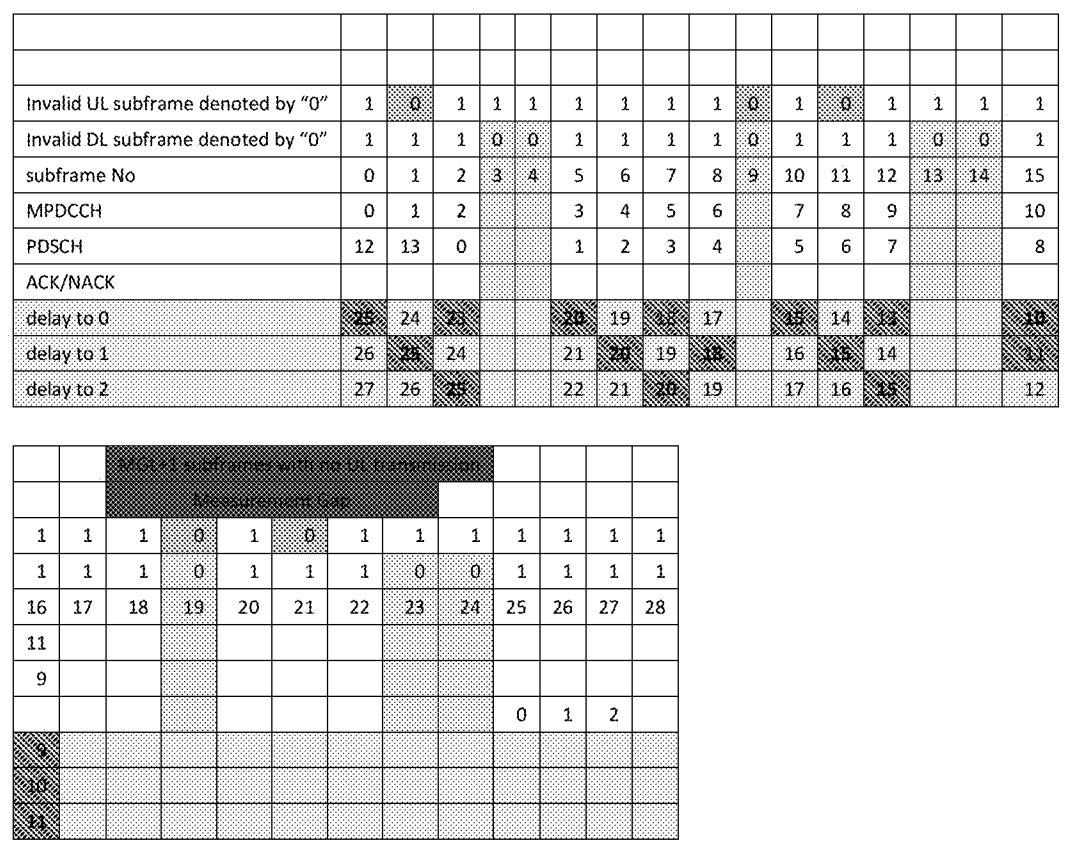
Figure 12:
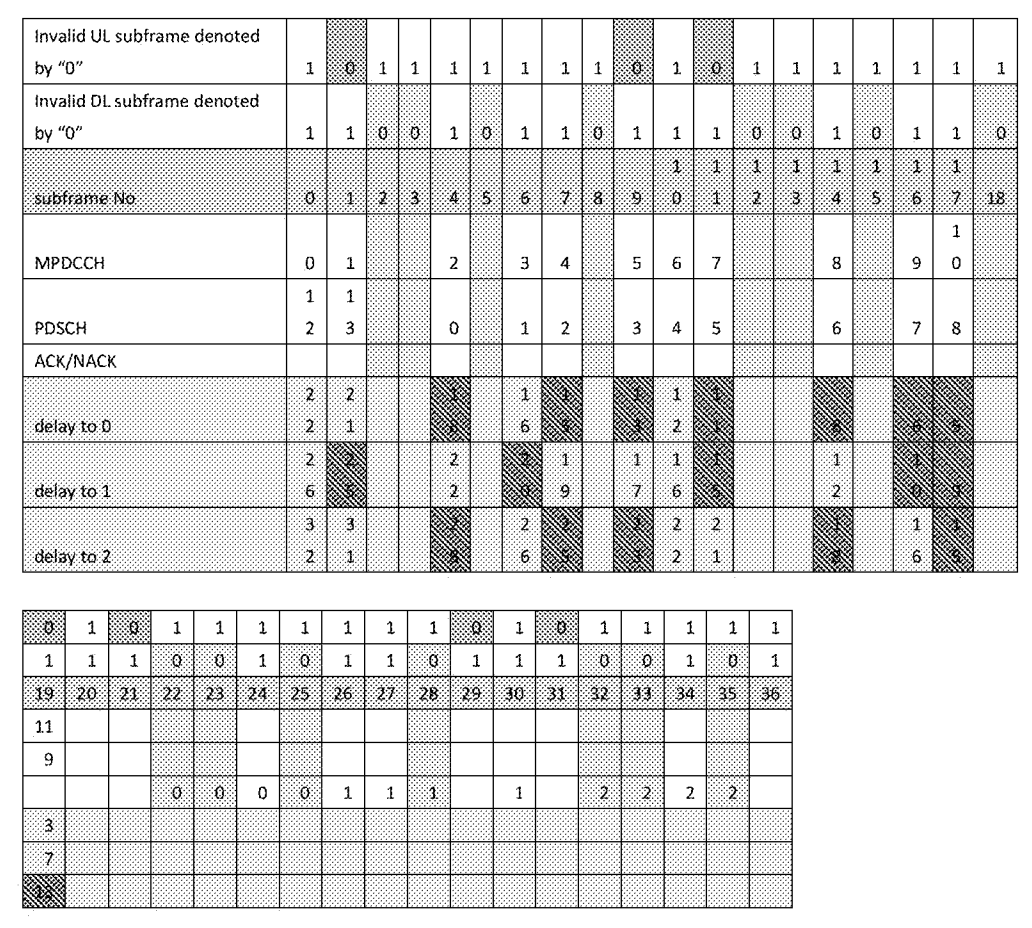

Some examples are shown in FIGS. 10-12 for illustrating the HARQ-ACK scheduling counting strategy using Table 3 when "14 HARQ processes in DL using HARQ-ACK bundling for a Cat M1 HD-FDD UE" is configured.

Example 4: "HARQ-ACK scheduling counting strategy using Table 3 when "14 HARQ processes in DL using HARQ-ACK bundling for a Cat M1 HD-FDD UE" is subject to the presence of invalid BL/CE DL subframes, invalid BL/CE UL subframes, and Measurement gaps" is described with reference to FIG. 10.

The delay values highlighted with a "diagonal dash" pattern are available in HARQ-ACK delay set of Table 3.

In example 4, with the 'HARQ-ACK delay' based on Table 3, still not all the 12 HARQ processes can be used as HARQ process #12, #0, #1, #3, #5 and #7 can only use HARQ-ACK bundle 1 (recall that the number of PDSCH transmissions bundled in one HARQ-ACK cannot exceed 4). Thus, in this example, with new 'HARQ-ACK delay' table, the max number of HARQ process that can be scheduled is 11 instead of 12.

Example 5: "The scenario is the same as Example 4 except that the measurement gap is shifted to subframes the right, which results in different HARQ-ACK delay requirements" is described with reference to FIG. 11.

The delay values highlighted with a "diagonal dash" pattern are available in HARQ-ACK delay set of Table 3.

In Example 5, with a 'HARQ-ACK delay' based on Table 3, all the 12 HARQ processes can be scheduled at the same time.

Example 6: "This example represents a scenario with no presence of measurement gap, which results in different HARQ-ACK delay requirements" is described with reference to FIG. 12.

The delay values highlighted with a "diagonal dash" pattern are available in HARQ-ACK delay set of Table 3.

In Example 6, with a 'HARQ-ACK delay' based on Table 3, even though there is no MG not all the 12 HARQ processes can be used (Note that for HARQ process #12 and #4, there is no available HARQ-ACK delay). Thus, as mentioned earlier the set of HARQ-ACK delay values in Table 3 do not cover all possible scenarios that may arise from having individual or simultaneous presence of PUCCH repetitions, invalid BL/CE DL subframes, invalid BL/CE UL subframes, and Measurement gaps, reason why the set of HARQ-ACK delays should account for the most common scenarios foreseen in real deployments.

In one embodiment the HARQ-ACK delay counting strategies for the support of 14 HARQ processes in DL can be described as set of rules or any other form/format other than the Table format, e.g., Table 3.

It should be noted that the aforesaid embodiments are illustrative instead of restricting, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. Embodiments can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

What is claimed is:

1. A method performed by a User Equipment (UE), the method comprising:
   receiving downlink control information indicating a Hybrid Automatic Repeat reQuest Acknowledgement (HARQ-ACK) delay value associated with a Hybrid Automatic Repeat reQuest (HARQ) process in Long-Term Evolution Machine Type Communication (LTE-MTC); and
   transmitting a Physical Uplink Control Channel (PUCCH) including HARQ-ACK or Hybrid Automatic Repeat reQuest Negative Acknowledgement (HARQ-NACK) with a delay in accordance with the HARQ-ACK delay value,
   wherein the HARQ-ACK delay value is:
   a number N of Bandwidth Reduced Low Complexity/Coverage Enhancement (BL/CE) Downlink (DL) subframes+1 subframe+a number M of BL/CE Uplink (UL) subframes.

2. The method of claim 1, wherein N=11.

3. The method of claim 2, wherein:
   M=1; or
   M=1*Rpucch+1; or
   M=2*Rpucch+1,
   wherein Rpucch represents a number of PUCCH repetitions.

4. The method of claim 1, wherein the HARQ-ACK delay value is represented as one of a plurality of multi-bit values in a HARQ-ACK delay table.

5. The method of claim 1, wherein the HARQ-ACK delay value is associated with 14 HARQ processes in DL using HARQ-ACK bundling for a Category (Cat) M1 Half-Duplex Frequency Division Duplex (HD-FDD) User Equipment (UE).

6. The method of claim 1, further comprising:
   being configured for 14 HARQ processes in DL using HARQ-ACK bundling for a Category (Cat) M1 Half-Duplex Frequency Division Duplex (HD-FDD) UE.

7. The method of claim 1, further comprising:
   receiving Physical Downlink Shared Channel (PDSCH) scheduled by the downlink control information,
   wherein the HARQ-ACK or HARQ-NACK is for the PDSCH.

8. The method of claim 7, wherein the PUCCH is transmitted with a delay in accordance with the HARQ-ACK delay value relative to the PDSCH.

9. The method of claim 1, further comprising:
   receiving Physical Downlink Shared Channel (PDSCH),
   wherein a delay counting for the HARQ-ACK delay value starts after the last subframe in which the PDSCH is received.

10. An apparatus comprising:
    a storage device configured to store a computer program comprising computer instructions; and
    a processor coupled to the storage device and configured to execute the computer instructions to cause the apparatus to:
    receive downlink control information indicating a Hybrid Automatic Repeat reQuest Acknowledgement (HARQ-ACK) delay value associated with a Hybrid Automatic Repeat reQuest (HARQ) process in Long-Term Evolution Machine Type Communication (LTE-MTC); and
    transmit a Physical Uplink Control Channel (PUCCH) including HARQ-ACK or Hybrid Automatic Repeat reQuest Negative Acknowledgement (HARQ-NACK) with a delay in accordance with the HARQ-ACK delay value,
    wherein the HARQ-ACK delay value is:
    a number N of Bandwidth Reduced Low Complexity/Coverage Enhancement (BL/CE) Downlink (DL) subframes+1 subframe+a number M of BL/CE Uplink (UL) subframes.

11. The apparatus of claim 10, wherein N=11.

12. The apparatus of claim 11, wherein:
    M=1; or
    M=1*Rpucch+1; or
    M=2*Rpucch+1,
    wherein Rpucch represents a number of PUCCH repetitions.

13. The apparatus of claim 10, wherein the HARQ-ACK delay value is represented as one of a plurality of multi-bit values in a HARQ-ACK delay table.

14. The apparatus of claim 10, wherein the HARQ-ACK delay value is associated with 14 HARQ processes in DL using HARQ-ACK bundling for a Category (Cat) M1 Half-Duplex Frequency Division Duplex (HD-FDD) User Equipment (UE).

15. The apparatus of claim 10, wherein the processor is configured to execute the computer instructions to cause the apparatus to:
be configured for 14 HARQ processes in DL using HARQ-ACK bundling for a Category (Cat) M1 Half-Duplex Frequency Division Duplex (HD-FDD) User Equipment (UE).

16. The apparatus of claim 10, wherein the processor is configured to execute the computer instructions to cause the apparatus to:
receive Physical Downlink Shared Channel (PDSCH) scheduled by the downlink control information,
wherein the HARQ-ACK or HARQ-NACK is for the PDSCH.

17. The apparatus of claim 16, wherein the PUCCH is transmitted with a delay in accordance with the HARQ-ACK delay value relative to the PDSCH.

18. The apparatus of claim 10, wherein the processor is configured to execute the computer instructions to cause the apparatus to:
receive Physical Downlink Shared Channel (PDSCH),
wherein a delay counting for the HARQ-ACK delay value starts after the last subframe in which the PDSCH is received.

19. A method comprising:
transmitting downlink control information indicating a Hybrid Automatic Repeat reQuest Acknowledgement (HARQ-ACK) delay value to a User Equipment (UE),
wherein the HARQ-ACK delay value is:
a number N of Bandwidth Reduced Low Complexity/ Coverage Enhancement (BL/CE) Downlink (DL) subframes+1 subframe+a number M of BL/CE Uplink (UL) subframes.

20. The method of claim 19, wherein N=11, and wherein:
M=1; or
M=1*Rpucch+1; or
M=2*Rpucch+1,
wherein Rpucch represents a number of Physical Uplink Control Channel (PUCCH) repetitions.

21. The method of claim 19, wherein the HARQ-ACK delay value is associated with 14 HARQ processes in DL using HARQ-ACK bundling for a Category (Cat) M1 Half-Duplex Frequency Division Duplex (HD-FDD) User Equipment (UE).

22. The method of claim 19, further comprising:
receiving a Physical Uplink Control Channel (PUCCH) including HARQ-ACK or Hybrid Automatic Repeat reQuest Negative Acknowledgement (HARQ-NACK) with a delay in accordance with the HARQ-ACK delay value.

23. An apparatus comprising:
a storage device configured to store a computer program comprising computer instructions; and
a processor coupled to the storage device and configured to execute the computer instructions to cause the apparatus to:
transmit downlink control information indicating a Hybrid Automatic Repeat reQuest Acknowledgement (HARQ-ACK) delay value to a User Equipment (UE),
wherein the HARQ-ACK delay value is:
a number N of Bandwidth Reduced Low Complexity/ Coverage Enhancement (BL/CE) Downlink (DL) subframes+1 subframe+a number M of BL/CE Uplink (UL) subframes.

24. The apparatus of claim 23, wherein N=11, and wherein:
M=1; or
M=1*Rpucch+1; or
M=2*Rpucch+1,
wherein Rpucch represents a number of Physical Uplink Control Channel (PUCCH) repetitions.

25. The apparatus of claim 23, wherein the HARQ-ACK delay value is associated with 14 HARQ processes in DL using HARQ-ACK bundling for a Category (Cat) M1 Half-Duplex Frequency Division Duplex (HD-FDD) UE.

26. The apparatus of claim 23, wherein the processor is configured to execute the computer instructions to cause the apparatus to:
receive a Physical Uplink Control Channel (PUCCH) including HARQ-ACK or Hybrid Automatic Repeat reQuest Negative Acknowledgement (HARQ-NACK) with a delay in accordance with the HARQ-ACK delay value.

* * * * *